(12) United States Patent
Frosch et al.

(10) Patent No.: US 12,468,363 B2
(45) Date of Patent: Nov. 11, 2025

(54) BIDIRECTIONAL POWER OVER ETHERNET TO USB-C CONVERTER FOR POWER AND DATA

(71) Applicant: PHIHONG TECHNOLOGY CO., LTD., Taoyuan (TW)

(72) Inventors: Richard Frosch, Bohemia, NY (US); Joseph DaSilva, Bohemia, NY (US); Zhenya Gong, Bohemia, NY (US)

(73) Assignee: PHIHONG TECHNOLOGY CO., LTD., Taoyuan (TW)

( * ) Notice: Subject to any disclaimer, the term of this patent is extended or adjusted under 35 U.S.C. 154(b) by 119 days.

(21) Appl. No.: 18/460,109

(22) Filed: Sep. 1, 2023

(65) Prior Publication Data

US 2025/0076944 A1    Mar. 6, 2025

(51) Int. Cl.
| | |
|---|---|
| *G06F 1/26* | (2006.01) |
| *G06F 13/38* | (2006.01) |
| *G06F 13/42* | (2006.01) |
| *H04L 12/10* | (2006.01) |

(52) U.S. Cl.
CPC .............. *G06F 1/26* (2013.01); *G06F 13/382* (2013.01); *G06F 13/4282* (2013.01); *H04L 12/10* (2013.01); *G06F 2213/0042* (2013.01)

(58) Field of Classification Search
CPC ....... G06F 1/26; G06F 13/382; G06F 13/4282
See application file for complete search history.

(56) References Cited

U.S. PATENT DOCUMENTS

| | | | | |
|---|---|---|---|---|
| 2007/0121832 | A1* | 5/2007 | Ghoshal | H04L 12/10 379/93.36 |
| 2008/0104301 | A1* | 5/2008 | Assouad | G06F 1/1632 710/303 |
| 2015/0311753 | A1* | 10/2015 | Scifres | H02J 3/00 713/300 |
| 2016/0359405 | A1* | 12/2016 | Li | H02M 1/32 |
| 2016/0370835 | A1* | 12/2016 | Erickson | G06F 13/4282 |
| 2018/0060270 | A1* | 3/2018 | Schnell | G06F 13/4022 |
| 2019/0327099 | A1* | 10/2019 | Vanich | G06F 1/266 |
| 2022/0350387 | A1* | 11/2022 | Alstad | G06F 13/4282 |

* cited by examiner

*Primary Examiner* — Hyun Soo Kim
(74) *Attorney, Agent, or Firm* — Muncy, Geissler, Olds & Lowe, P.C.

(57) ABSTRACT

A bidirectional PoE to USB-C converter for power and data, which includes a PoE interface to receive and transmit PoE power and Ethernet data, a USB-C interface to receive and transmit USB-C power and data, an Ethernet/USB data converter configured to transpose Ethernet data from the PoE interface to the USB-C interface and vice versa by determining communication protocol therein between and processing incoming Ethernet data signals into USB-C data formats and vice versa, a bidirectional power converter, used to convert PoE voltage to fit USB-C voltage, or used to convert said USB-C voltage to fit said PoE voltage depended on power and data flows, and a USB-C PD controller configured to manage conversion of PoE power signal form a PoE source into a power charging signal for USB-C interface, or to provide power to a device connected to said PoE interface, depended on power and data flows.

20 Claims, 3 Drawing Sheets

BIDIRECTIONAL POWER OVER ETHERNET TO USB-C CONVERTER FOR POWER AND DATA

TECHNICAL FIELD

The present invention relates to technology field of power over Ethernet (PoE), and more particularly, a bidirectional PoE to Universal Serial Bus type C (USB-C) converter for power and data.

BACKGROUND

As the number of home terminals, monitoring equipment, and enterprise network communication products increases, there is a growing trend of opting for system power supply through network cables. This choice eliminates the need for AC adapters, avoiding any associated inconveniences. Consequently, the utilization of Ethernet technology is set to expand further. The devices facilitating this power supply and power reception are referred to as PoE equipment, which stands for Power over Ethernet. PoE technology enables the secure transmission of electrical power alongside data through Ethernet cables or lines.

USB technology was originally developed as a bus to establish connections between computers and electronic devices, serving both communication and power purposes. Over time, USB has replaced various computer interfaces like serial and parallel ports. Additionally, it has evolved to serve as a power charger for portable devices. The more recent USB-C connectors offer high data transfer rates and fast power delivery.

With the growing popularity and advancement of Power over Ethernet (POE) and USB-C devices capable of delivering power over different cabling systems, there arises a need for a device that can efficiently transfer power and data between these two cable mediums. While some devices can translate data between the two mediums, there are limited solutions for passing power from PoE to USB-C and no devices available for transferring power from USB-C to PoE.

Our proposed solution addresses this challenge by providing bidirectional power and data transfer between the two cable mediums. This functionality allows the product to be used interchangeably with either PoE or USB-C as the power source. End users will find this versatility highly beneficial, as they can use a single product regardless of the power medium available to them.

SUMMARY OF THE INVENTION

In one aspect of the present invention, a bidirectional Power over Ethernet (PoE) to USB-C converter is provided. This converter facilitates the transfer of both power and data and consists of the following components:
1. PoE Interface: This interface is responsible for receiving and transmitting PoE signals, which contain PoE power and Ethernet data.
2. USB-C Interface: This interface handles the reception and transmission of USB-C signals, containing USB-C power and USB-C data.
3. Ethernet/USB Data Converter: Positioned between the PoE interface and the USB-C interface, this converter transposes the Ethernet data from the PoE interface to the USB-C interface, and vice versa. It accomplishes this by determining the communication protocol between the two interfaces and processing incoming Ethernet data signals into USB-C data formats and vice versa.
4. Bidirectional Power Converter: Connected between the PoE interface and the USB-C interface, this power converter serves two purposes. When the power and data flow from the PoE interface to the USB-C interface, it steps down the PoE voltage to match the USB-C voltage. On the other hand, when the power and data flow from the USB-C interface to the PoE interface, it boosts up the USB-C voltage to match the PoE voltage.
5. USB-C Power Delivery Controller: This Controller is connected between the bidirectional power converter and the USB-C interface. Its primary role is to manage the conversion of the PoE power signal from a PoE source into a power charging signal for the USB-C interface when the power and data flow from the PoE interface to the USB-C interface. Conversely, it provides power to charge a device connected to the PoE interface when the power and data flow from the USB-C interface to the PoE interface.

In summary, this bidirectional PoE to USB-C converter facilitates seamless and efficient power and data transfer between devices using different interfaces and protocols.

In one preferred embodiment, the bidirectional power over Ethernet (POE) to USB-C converter further includes a supervisory microcontroller unit to control which components are activated depending on the direction of power flow.

In one preferred embodiment, the bidirectional power over Ethernet (POE) to USB-C converter further includes a power and data splitter/combiner disposed between the POE interface and the Ethernet/USB data converter to act as a power and data splitter when the power and data flow from the PoE interface to the USB-C interface.

In one preferred embodiment, the power and data splitter/combiner is acting as a power and data combiner when the power and data flow from the USB-C interface to the PoE interface.

In one preferred embodiment, the bidirectional power over Ethernet (POE) to USB-C converter further includes a PoE interface controller disposed between the power and data splitter/combiner and the bidirectional power converter, configured to negotiate with a PoE switch or a midspan to ensure the powering solution is IEEE 802.3 POE standards compliant and can incorporate all of the functions for a PoE system including detection, classification and inrush current limiting.

In one preferred embodiment, the PoE interface controller is a microcontroller unit (MCU).

In one preferred embodiment, the PoE interface is a RJ45 interface.

In one preferred embodiment, the PoE interface controller is a PD controller chipset.

In one preferred embodiment, the Ethernet/USB data converter is a data conversion chipset.

In one preferred embodiment, the USB-C PD controller is a USB-C PD microcontroller IC.

According to another aspect of the present invention, a bidirectional power over Ethernet (POE) to USB-C converter for power and data is proposed, which comprises a PoE interface to receive and transmit PoE signals containing PoE power and Ethernet data, a USB-C interface to receive and transmit USB-C signals containing USB-C power and USB-C data, an Ethernet/USB data converter coupled between the PoE interface and the USB-C interface configured to transpose the Ethernet data from the PoE interface to the USB-C interface and vice versa by determining communication protocol between the POE interface and the USB-C interface and processing incoming Ethernet data signals into USB-C data formats and vice versa, a power and data splitter/combiner disposed between the PoE interface and the Ethernet/USB data converter, configured to act as a power and data splitter when the power and data flow from the PoE interface to the USB-C interface, or to act as a power and data combiner when the power and data flow from the USB-C interface to the PoE interface, a bidirectional power converter coupled between the PoE interface and the USB-C interface, used to step down PoE voltage to fit USB-C voltage when the power and data flow from the PoE interface to the USB-C interface, or used to boost up the USB-C voltage to fit the PoE voltage when the power and data flow from the USB-C interface to the PoE interface, and a USB-C power delivery controller connected between the bidirectional power converter and the USB-C interface, configured to manage conversion of PoE power signal form a PoE source into a power charging signal for the USB-C interface when the power and data flow from the PoE interface to the USB-C interface, or to provide power to a device connected to the PoE interface when the power and data flow from the USB-C interface to the PoE interface.

In one preferred embodiment, the bidirectional power over Ethernet (POE) to USB-C converter, further includes a supervisory microcontroller unit to control components activated depending on direction of power flow.

In one preferred embodiment, the bidirectional power over Ethernet (POE) to USB-C converter, further includes a PoE interface controller disposed between the power and data splitter/combiner and the bidirectional power converter, configured to negotiate with a PoE switch or a midspan to ensure the powering solution is IEEE 802.3 POE standards compliant and can incorporate all of the functions for a PoE system including detection, classification and inrush current limiting.

In one preferred embodiment, the PoE interface controller is a microcontroller unit (MCU).

In one preferred embodiment, the PoE interface controller is a PD controller chipset.

In one preferred embodiment, the PoE interface is a RJ45 interface.

In one preferred embodiment, the Ethernet/USB data converter controls data transfer up to and including 10 Gb/s.

In one preferred embodiment, the Ethernet/USB data converter is a data conversion chipset.

In one preferred embodiment, the USB-C power delivery controller is a USB-C power delivery (PD) microcontroller IC.

BRIEF DESCRIPTION OF THE DRAWINGS

The components, characteristics and advantages of the present invention may be understood by the detailed descriptions of the preferred embodiments outlined in the specification and the drawings attached.

DETAILED DESCRIPTION

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

In the present invention, a bidirectional PoE to USB-C converter for power and data is proposed to convert Ethernet data to USB-C and vice versa except to add power in both directions using a bidirectional power converter.

The bidirectional power converter is constructed by using, for example, a buck/boost topology for power conversion, this product will buck down the PoE voltage to USB-C levels and in the other direction utilizing a boost topology to boost the USB-C voltage up to PoE voltage. Other required components may include a data conversion chipset to transpose the data from Ethernet to USB and vice versa, a microcontroller unit (MCU) will be used for the POE interface and a USB-C power delivery (PD) microcontroller IC will be used for the USB-C interface, and a supervisory MCU may need to be used to control components activated depending on direction of power flow.

In other alternatives, the bidirectional power converter can be any topology that converts power from one form to another to provide step down PoE voltage to USB-C levels and in the other direction to boost up the USB-C voltage to match the PoE voltage, such as flyback converter, half bridge converter, full bridge converter, buck converter, boost converter, LLC converter or the like.

Figure 1:
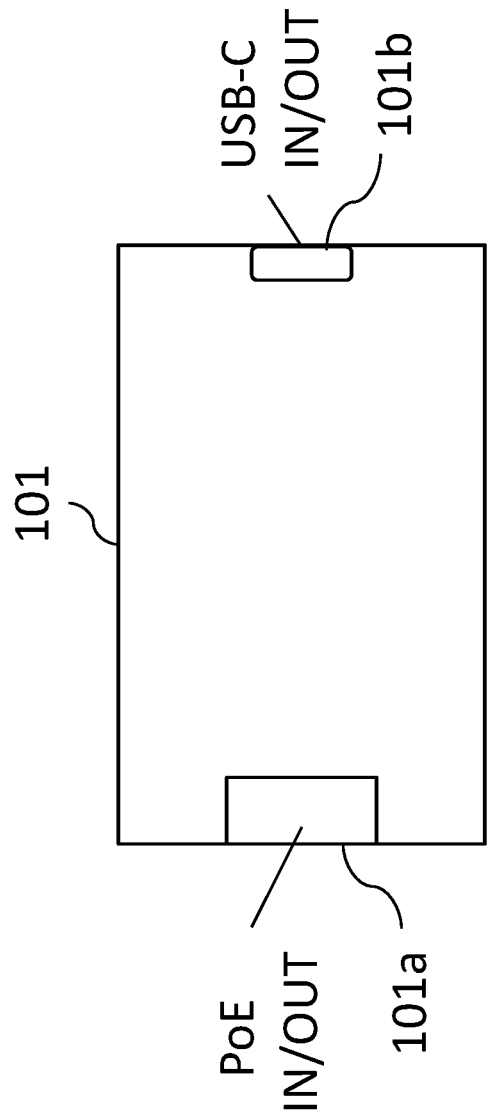
FIG. 1 shows a schematic drawing of the bidirectional PoE to USB-C converter according to one preferred embodiment of the present invention.

FIG. 1 illustrates a schematic drawing of the bidirectional PoE to USB-C converter 100 for passing power and data from PoE port to USB-C port and vice versa. As shown in FIG. 1, in one embodiment, the bidirectional PoE to USB-C converter 100 may be an apparatus include a case 101, the case 101 may at least include a PoE port 101*a* and a USB-C port for receiving plugs from different devices, i.e., the PoE port 101*a* is configured to receive a PoE plug from a PoE cable, while the USB-C port is configured to receive a USB-C connector plug. The case 101 also includes hidden internal electronic components that can be assembled onto a PCB board and be configured to electrically connect to the PoE port 101*a* and to the USB-C port 101*b*.

In one preferred embodiment of the present invention, the PoE port can be Ethernet RJ45 port to achieve DC power and data power transmission for powered device.

Figure 2A:
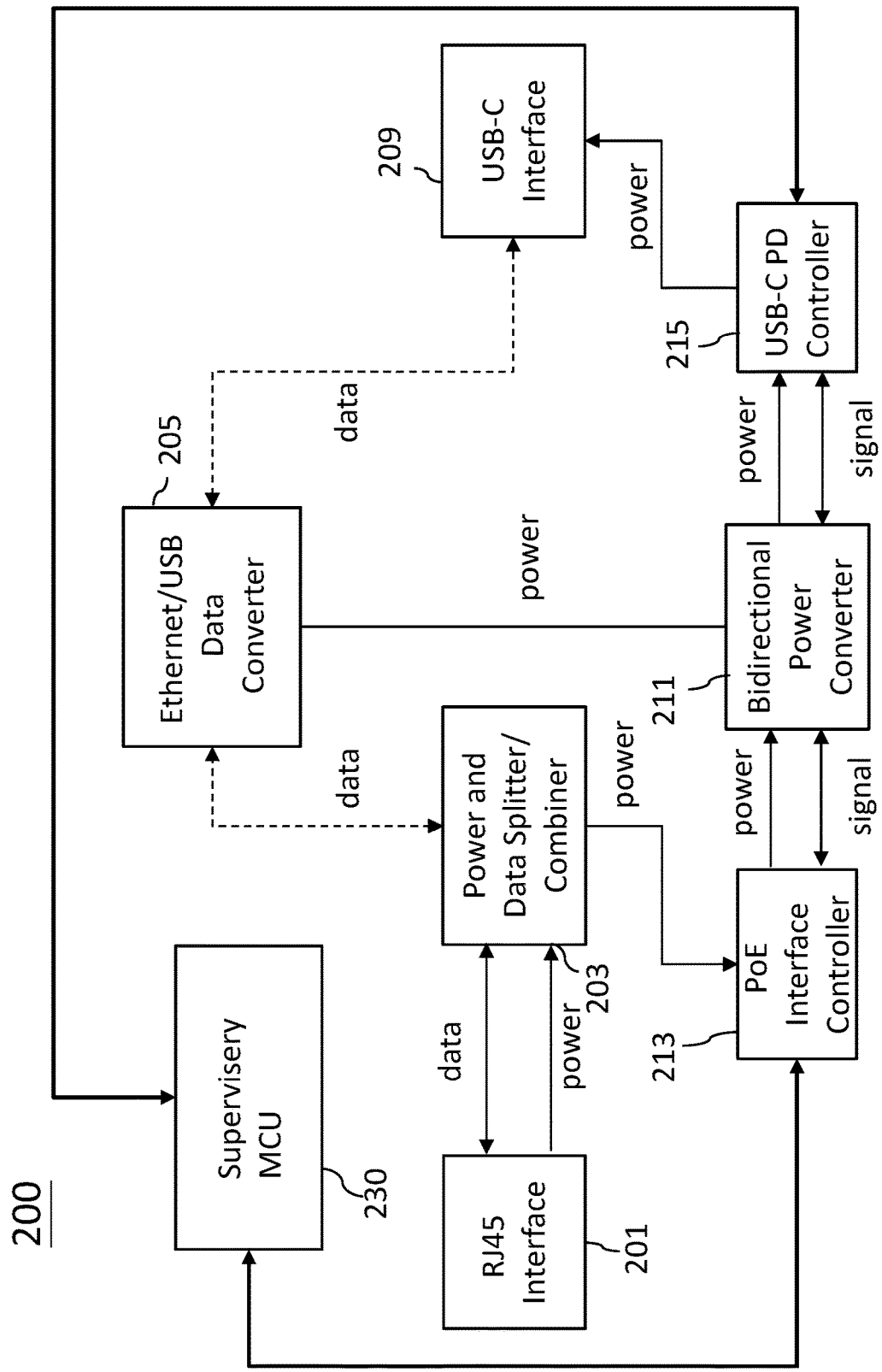
FIG. 2A shows a schematic block diagram of the bidirectional PoE to USB-C converter circuit, which depicts power and data flow from the PoE interface (RJ45 interface) to the USB-C interface.

Please refer to FIGS. 2A, it illustrates a schematic block diagram of the bidirectional PoE to USB-C converter circuit 200 according to an exemplary embodiment. Firstly, the power and data flows from PoE to USB-C will be explained. Typical PoE signals containing power and data are supplied to the bidirectional PoE to USB-C converter circuit 200 through a PoE interface 201. The combined data and power are then passed through a power and data splitter/combiner 203, splitting the power from the data. The data path in the circuit 200 generally transmits along the PoE interface (RJ45 interface) 201 to the power and data splitter/combiner 203, to the Ethernet/USB data converter 205, and out USB-C interface 209 to the connected USB-C device.

In some embodiments, the Ethernet/USB data converter 205 may include a data conversion chipset to transpose the data from Ethernet to USB and vice versa, which determines the communication protocols between the PoE interface (RJ45 interface) and the USB-C interface. Once the protocol is determined, the Ethernet/USB data converter 205 processing incoming Ethernet data signals into USB-C data formats and vice versa. The output of the Ethernet/USB data converter 205 may coupled to the USB-C interface. The Ethernet/USB data converter 205 may control data transfer up to 10 Gb/s. In some embodiments, a bidirectional power converter 211 may connect to the Ethernet/USB data converter 205. The Ethernet/USB data converter 205 may communicate to the USB-C device coupled to the USB-C interface 209.

The power path in the circuit 200 generally converts PoE input signals into power signals depending on the originating source device. Along the power path, in between the power and data splitter/combiner 203 and the USB-C interface 209, the circuit may include a PoE interface controller 213, the bidirectional power converter 211, and a USB-C power delivery (PD) controller 215.

In some embodiments, the USB-C PD controller 215 is a USB-C PD microcontroller IC.

In some embodiments, the power and data splitter/combiner 203 acts as a power and data splitter when the power and data flows from PoE to USB-C interface.

In some embodiments, the PoE interface controller 213, which may be a PoE interface MCU, that may negotiate with POE switch or a midspan to ensure the powering solution is IEEE 802.3 POE standards compliant, which may include IEEE 802.3af/at (15.4 Watts), IEEE 802.3bt (30 Watts) and next generation IEEE 802.3 POE (>100 Watts) compliant and can incorporate all of the functions for a PoE system including detection, classification and inrush current limiting.

In some embodiments, the power and data splitter/combiner 203 may split the power to the USB-C interface 209 leading to the bidirectional power converter 211 and the data to the Ethernet/USB data converter 205.

In some embodiments, the PoE voltage will be stepped down to fit the USB-C levels by using the bidirectional power converter 211.

In some embodiment, the power and data splitter/combiner 203 acts as a power and data splitter when the power and data flows from PoE to USB-C, while the power and data are combined in the USB-C interface.

In some embodiments, the USB-C PD controller 215 is configured to negotiate a device charging mode, for example constant voltage (CV), constant current (CC) or trickle charging mode, between a USB-C device connected to the USB-C interface 209 and a PoE source connected to the PoE interface 201, and to manage conversion of PoE power signal from the PoE source into a power charging signal for the USB-C device.

In some embodiments, the USB-C interface 209 is configurable to provide the Ethernet signals converted into the USB-C formats as readable data and charging power to the USB-C device.

Secondly, the power and data flows from USB-C to PoE will be explained. Please also refers to FIG. 2B, in another aspect, a USB-C device may act as a source to provide power through the USB-C interface 209, the USB-C interface 209 may act as a power supply port, i.e., while PoE interface 201 will act as a sink. Typical USB-C signals containing power and data are supplied to the bidirectional PoE to USB-C converter circuit 200 from the USB-C interface 209 through the USB-C PD controller 215. The combined data and power delivered from the USB-C interface 209 are split. The data path in the circuit 200 may transmit along the USB-C interface 209 to the Ethernet/USB data converter 205, to the power and data splitter/combiner 203 and out PoE interface 201 to the connected PoE device.

In some embodiments, the Ethernet/USB data converter 205 may include a data conversion chipset to transpose the data from USB to Ethernet and vice versa, which determines the communication protocols between the USB-C interface 209 and the PoE interface 201. When the protocol is determined, the Ethernet/USB data converter 205 processing incoming USB-C data signals into Ethernet data formats and vice versa. The output of the Ethernet/USB data converter 205 may coupled to the PoE interface 201 through the power and data/combiner 203. The Ethernet/USB data converter 205 may control data transfer up to and including 10 Gb/s. In some embodiments, the bidirectional power converter 211 may connect to Ethernet/USB data converter 205 to provide power to operate the Ethernet/USB data converter 205. The Ethernet/USB data converter 205 may communicate to the PoE device coupled to the POE interface 201.

Figure 2B:
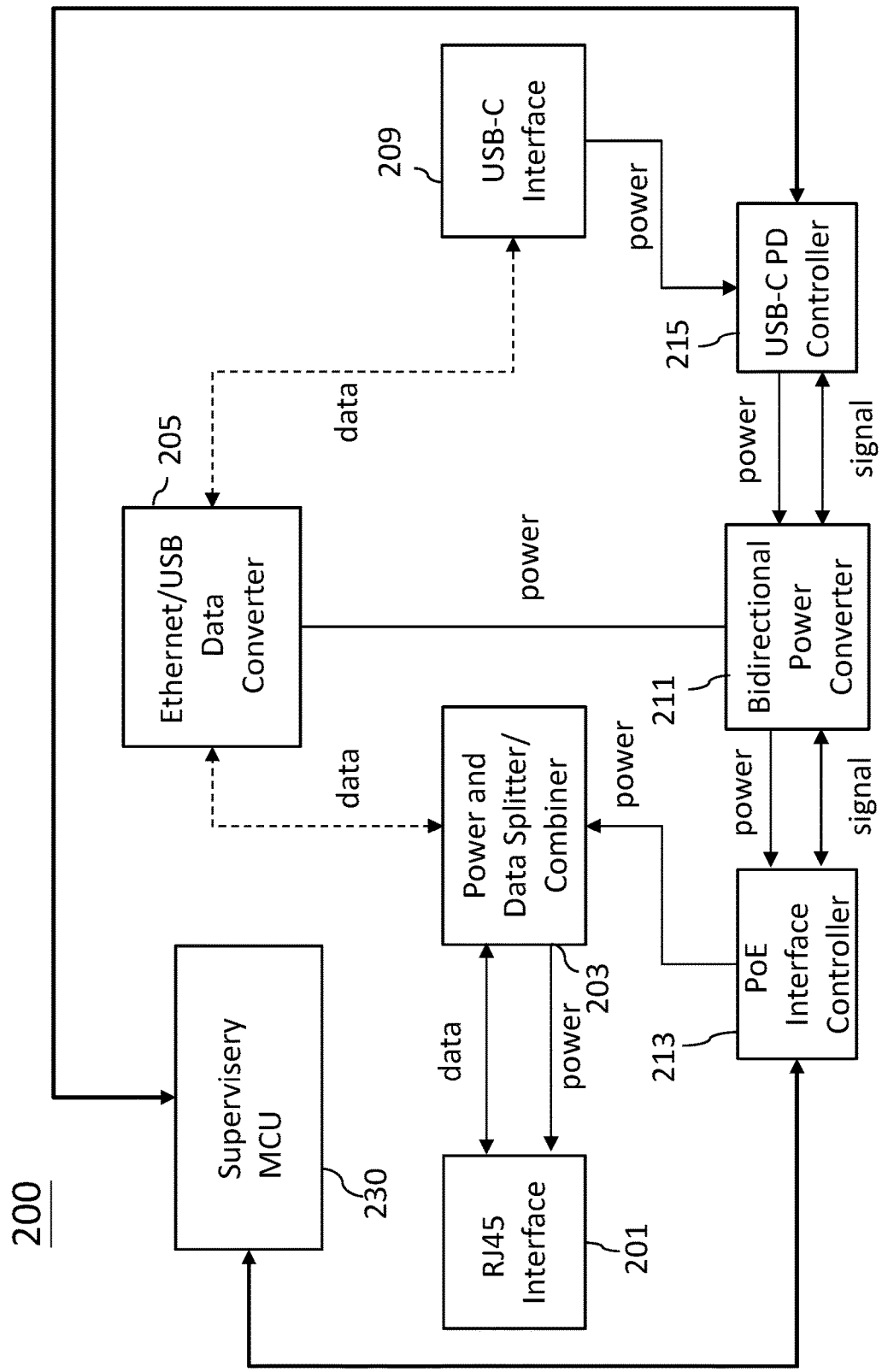
FIG. 2B shows a schematic block diagram of the bidirectional PoE to USB-C converter circuit, which depicts power and data flow from the USB-C interface to the PoE interface (RJ45 interface).

As shown in FIG. 2B, the power path in the circuit 200 can convert USB-C input signals into power signals depending on the originating source USB-C device. Along the power path, in between USB-C interface 209 and PoE interface 201, the circuit may include the USB-C-PD controller 215, the bidirectional power converter 211, the PoE interface controller 213, and the power and data splitter/combiner 203.

In some embodiments, the USB-C PD controller 215 is configured to provide power to charge a device connected to the PoE interface 201.

In some embodiments, the USB-C voltage will be boosted up to fit the PoE levels by using the bidirectional power converter 211.

In some embodiments, the PoE interface controller 213, which may be a PoE interface MCU or a chipset, that may negotiate with POE switch or a midspan to ensure the powering solution is IEEE 802.3 POE standards compliant, which may include IEEE 802.3af/at (15.4 Watts) and IEEE 802.3bt (30 Watts) and next generation IEEE 802.3 POE (>100 Watts) compliant and can incorporate all of the functions for a PoE system including detection, classification and inrush current limiting.

In some embodiments, the power and data splitter/combiner 203 is acted as a power and data combiner when the power and data flow from USB-C to PoE interface.

In some embodiments, a supervisory MCU 230 may need to be used to control components activated depending on direction of power flow.

It should also be emphasized that the USB-C PD control processes executed by the USB-C PD controller 215 will incorporate both USB sink and source functions. This proper operation of either sink or source function will be determined by the supervisory MCU 230.

In addition, the separated power and data path that depicted in both FIG. 2A and FIG. 2B are only for illustrating the power delivery path from the PoE interface (RJ45 interface) to the USB-C interface or vice versa. Skilled persons in this technical field should understand that both data and power is transferred in a single Ethernet RJ45 cable.

While various embodiments of the present invention have been described above, it should be understood that they have been presented by a way of example and not limitation. Numerous modifications and variations within the scope of the invention are possible. The present invention should only be defined in accordance with the following claims and their equivalents.

What is claimed is:

1. A bidirectional power over Ethernet (POE) to USB-C converter for power and data, comprising:
   an Ethernet/USB data converter coupled between a PoE interface and a USB-C interface, wherein said Ethernet/USB data converter transposes Ethernet data from said PoE interface to said USB-C interface and USB-C data from said USB-C interface to said PoE interface by determining communication protocols between said PoE interface and said USB-C interface and processing incoming Ethernet data signals from said PoE interface into USB-C data formats and incoming USB-C data signals from said USB-C interface into PoE data formats;
   a bidirectional power converter coupled between said PoE interface and said USB-C interface, selectively used to step down PoE voltage to fit USB-C voltage when said power and data flow from said PoE interface to said USB-C interface, and used to boost up said USB-C voltage to fit said PoE voltage when said power and data flow from said USB-C interface to said PoE interface; and
   a USB-C power delivery (PD) controller connected between said bidirectional power converter and said USB-C interface, wherein said USB-C PD controller manages conversion of PoE power signal from a PoE source into a power charging signal for said USB-C interface when said power and data flow from said PoE interface to said USB-C interface, or to provides power to a device connected to said PoE interface when said power and data flow from said USB-C interface to said PoE interface.

2. The bidirectional power over Ethernet (POE) to USB-C converter of claim 1, further including a supervisory microcontroller unit to control components activated depending on direction of power flow.

3. The bidirectional power over Ethernet (POE) to USB-C converter of claim 1, further including a power and data splitter/combiner disposed between said PoE interface and said Ethernet/USB data converter to act as a power and data splitter when said power and data flow from said PoE interface to said USB-C interface.

4. The bidirectional power over Ethernet (POE) to USB-C converter of claim 3, wherein said power and data splitter/combiner is acted as a power and data combiner when said power and data flow from said USB-C interface to said PoE interface.

5. The bidirectional power over Ethernet (POE) to USB-C converter of claim 4, further including a PoE interface controller disposed between said power and data splitter/combiner and said bidirectional power converter, configured to negotiate with a PoE switch or a midspan to ensure the powering solution is IEEE 802.3 POE standards compliant and incorporate all of the functions for a PoE system including detection, classification and inrush current limiting.

6. The bidirectional power over Ethernet (POE) to USB-C converter of claim 5, wherein said PoE interface controller is a microcontroller unit (MCU).

7. The bidirectional power over Ethernet (POE) to USB-C converter of claim 5, wherein said PoE interface controller is a chipset.

8. The bidirectional power over Ethernet (POE) to USB-C converter of claim 1, wherein said PoE interface is a RJ45 interface.

9. The bidirectional power over Ethernet (POE) to USB-C converter of claim 1, wherein said Ethernet/USB data converter is a data conversion chipset.

10. The bidirectional power over Ethernet (POE) to USB-C converter of claim 1, wherein said bidirectional power converter includes flyback converter, half bridge converter, full bridge converter, buck converter, boost converter, or the like.

11. The bidirectional power over Ethernet (POE) to USB-C converter of claim 1, wherein said USB-C PD controller is a USB-C PD microcontroller IC.

12. A bidirectional power over Ethernet (POE) to USB-C converter for power and data, comprising:
    an Ethernet/USB data converter coupled between a PoE interface and a USB-C interface, wherein said Ethernet/USB data converter transposes Ethernet data from said PoE interface to said USB-C interface and USB-C data from said USB-C interface to said PoE interface by determining communication protocols between said PoE interface and said USB-C interface and processing incoming Ethernet data signals into USB-C data formats and incoming USB-C data signals from said USB-C interface into PoE data formats;
    a power and data splitter/combiner disposed between said PoE interface and said Ethernet/USB data converter, wherein said power and data splitter/combiner acts as a power and data splitter when said power and data flow from said PoE interface to said USB-C interface, or acts as a power and data combiner when said power and data flow from said USB-C interface to said PoE interface;
    a bidirectional power converter coupled between said PoE interface and said USB-C interface, selectively used to step down PoE voltage to fit USB-C voltage when said power and data flow from said PoE interface to said USB-C interface, and used to boost up said USB-C voltage to fit said PoE voltage when said power and data flow from said USB-C interface to said PoE interface; and
    a USB-C power delivery (PD) controller connected between said USB-C interface and said bidirectional power converter, wherein said USB-C PD controller manages conversion of PoE power signal form a PoE source into a power charging signal for said USB-C interface when said power and data flow from said PoE interface to said USB-C interface, or to provides power to a device connected to said PoE interface when said power and data flow from said USB-C interface to said PoE interface.

13. The bidirectional power over Ethernet (POE) to USB-C converter of claim 12, further including a supervisory microcontroller unit to control components activated depending on direction of power flow.

14. The bidirectional power over Ethernet (POE) to USB-C converter of claim 12, further including a PoE interface controller disposed between said power and data splitter/combiner and said bidirectional power converter, configured to negotiate with a PoE switch or a midspan to ensure the powering solution is IEEE 802.3 POE standards compliant and incorporate all of the functions for a PoE system including detection, classification and inrush current limiting.

15. The bidirectional power over Ethernet (POE) to USB-C converter of claim 14, wherein said PoE interface controller is a microcontroller unit (MCU).

16. The bidirectional power over Ethernet (POE) to USB-C converter of claim 14, wherein said PoE interface controller is a chipset.

17. The bidirectional power over Ethernet (POE) to USB-C converter of claim 14, wherein said bidirectional power converter includes flyback converter, half bridge converter, full bridge converter, buck converter, boost converter, or the like.

18. The bidirectional power over Ethernet (POE) to USB-C converter of claim 12, wherein said PoE interface is a RJ45 interface.

19. The bidirectional power over Ethernet (POE) to USB-C converter of claim 12, wherein said Ethernet/USB data converter controls data transfer up to and including 10 Gb/s.

20. The bidirectional power over Ethernet (POE) to USB-C converter of claim 12, wherein said Ethernet/USB data converter is a data conversion chipset.

\* \* \* \* \*